United States Patent
Behr et al.

(10) Patent No.: US 12,384,205 B2
(45) Date of Patent: Aug. 12, 2025

(54) PNEUMATIC TYRE FOR A VEHICLE

(71) Applicant: Continental Reifen Deutschland GmbH, Hannover (DE)

(72) Inventors: Ulrich Behr, Hannover (DE); Zi-Jie Soo, Shah Alam (MY)

(73) Assignee: Continental Reifen Deutschland GmbH, Hannover (DE)

( * ) Notice: Subject to any disclaimer, the term of this patent is extended or adjusted under 35 U.S.C. 154(b) by 418 days.

(21) Appl. No.: 17/758,483

(22) PCT Filed: Dec. 2, 2020

(86) PCT No.: PCT/EP2020/084284
§ 371 (c)(1),
(2) Date: Jul. 7, 2022

(87) PCT Pub. No.: WO2021/139929
PCT Pub. Date: Jul. 15, 2021

(65) Prior Publication Data
US 2023/0031108 A1 Feb. 2, 2023

(30) Foreign Application Priority Data
Jan. 10, 2020 (DE) .................... 10 2020 200 265.7

(51) Int. Cl.
*B60C 11/13* (2006.01)
(52) U.S. Cl.
CPC ............ *B60C 11/1307* (2013.01); *B60C 2011/1338* (2013.01); *B60C 2011/1361* (2013.01)
(58) Field of Classification Search
CPC .......... B60C 11/24; B60C 11/1281; B60C 11/1353; B60C 2011/1338
See application file for complete search history.

(56) References Cited

U.S. PATENT DOCUMENTS

| 5,957,180 A * | 9/1999 | Kuramochi ............ B60C 11/13 152/902 |
| 2013/0098520 A1* | 4/2013 | Kato ...................... B60C 11/13 152/209.1 |

(Continued)

FOREIGN PATENT DOCUMENTS

| DE | 102010016977 A1 | 11/2011 |
| DE | 102014218871 A1 | 3/2016 |

(Continued)

OTHER PUBLICATIONS

Chinese Office Action dated Jan. 4, 2024 corresponding with Chinese Patent Application No. 202080092200.8.

(Continued)

*Primary Examiner* — Kendra Ly
(74) *Attorney, Agent, or Firm* — Richard A. Wolf; Gregory Adams

(57) ABSTRACT

The invention relates to a pneumatic vehicle tyre having a tread with at least one, in particular straight, circumferential groove (1) which is formed at profile depth ($T_1$), is delimited by groove flanks (5, 6) and a groove base (4) of U-shaped cross section, and has a width ($B_1$) which is ascertained at the tread periphery in the axial direction, wherein a number of projections (7), which are arranged distributed over the circumference of the circumferential groove (1) and are situated opposite one another in pairs in the axial direction, is formed on the groove base (4), possibly with connection to the groove flanks (5, 6), a groove path (8) of the circumferential groove (1), which groove path reaches profile depth ($T_1$), has a constriction and is of symmetrical configuration with respect to a plane ($E_1$) which is spanned by the radial direction and a vertical to the centre line of the circumferential groove (1), running between respective projections.

(Continued)

Figure 1:
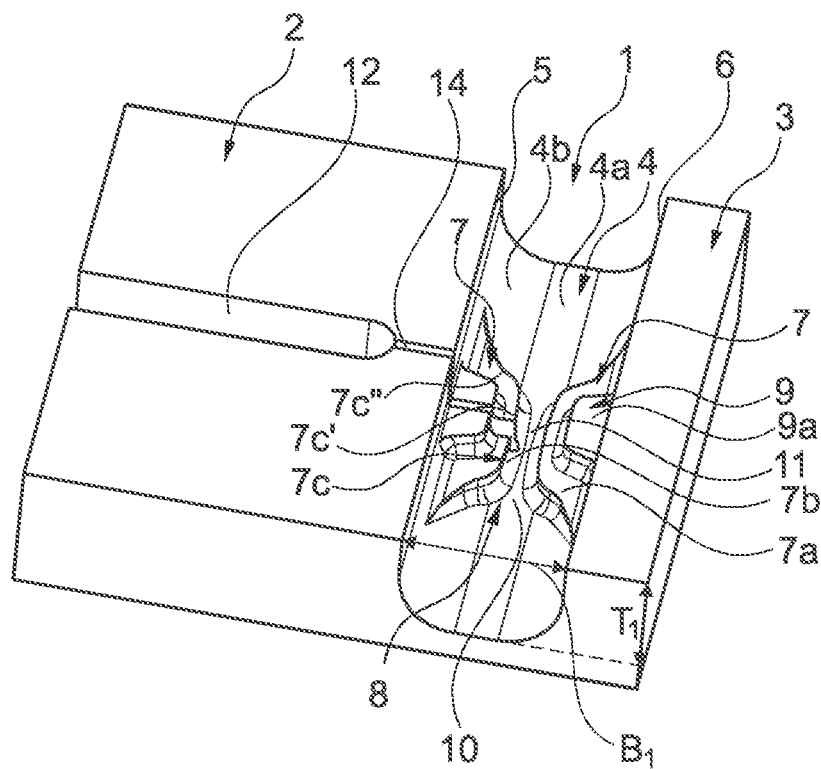

In a tyre of this kind, the projections should be configured in a more expedient manner with respect to the water discharge capacity of the circumferential groove.

This is achieved by way of the projections (7) ending at the groove flanks (5, 6) or at the groove base (4) in the circumferential direction and running in such a way that the groove path (8) runs symmetrically with respect to a second plane ($E_2$), which is spanned by the centre line of the circumferential groove (1) and the radial direction, and is made up of two Venturi sections (10) which narrow in the manner of a funnel to form the constriction.

18 Claims, 2 Drawing Sheets

(56) References Cited

U.S. PATENT DOCUMENTS

| | | | |
|---|---|---|---|
| 2013/0213542 A1* | 8/2013 | Warfford | B60C 11/12 152/209.1 |
| 2017/0297377 A1* | 10/2017 | Honda | B60C 11/0304 |
| 2017/0326919 A1 | 11/2017 | Heinhaupt | |
| 2018/0170116 A1 | 6/2018 | Daries | |
| 2021/0178826 A1 | 6/2021 | Lutz et al. | |

FOREIGN PATENT DOCUMENTS

| | | |
|---|---|---|
| DE | 102015200360 A1 | 7/2016 |
| DE | 102017219532 A1 | 5/2019 |
| DE | 102018208349 A1 | 11/2019 |
| JP | H09142105 A | 6/1997 |
| JP | 2001322407 A | 11/2001 |
| JP | 2012020604 A | 2/2012 |
| KR | 20130057259 A | 5/2013 |
| WO | 2019086153 A1 | 5/2019 |

OTHER PUBLICATIONS

Example analysis of CFD application in engineering field 2019.
Notice to Submit Response dated Mar. 22, 2024 for the counterpart Korean Patent Application No. 10-2022-7026752 and machine translation of same.
International Search Report dated Feb. 2, 2021 of International Application PCT/EP2020/084284 on which this application is based.
Chinese Office Action dated Apr. 19, 2023 in the corresponding Chinese Patent Application No. 202080092200.8.
KR Office Action dated Mar. 14, 2025 of counterpart Korean Patent Application No. 10-2022-7026752.

\* cited by examiner

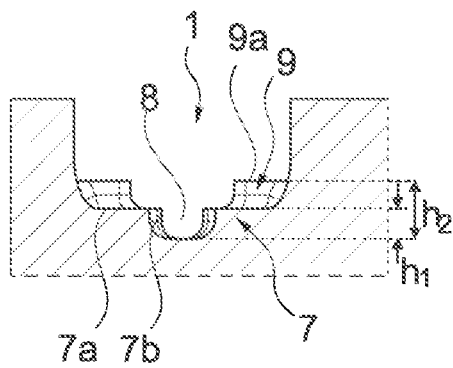
Fig. 3: Section III - III
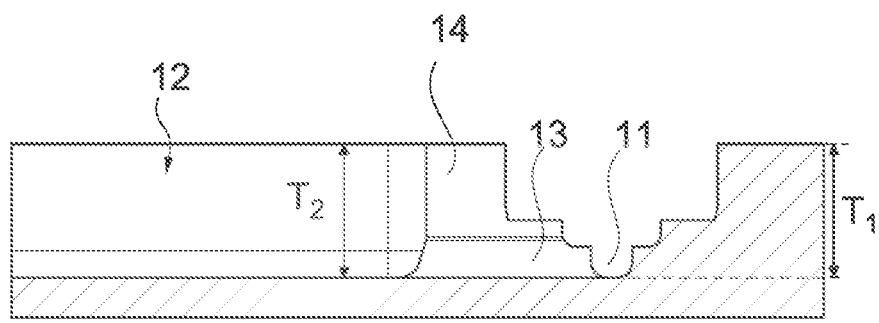
Fig. 4: Section IV - IV
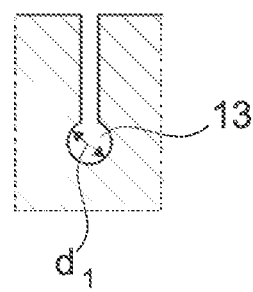
Fig. 5: Section V - V

PNEUMATIC TYRE FOR A VEHICLE

The invention relates to a pneumatic vehicle tyre having a tread with at least one, in particular straight, circumferential groove which is formed at profile depth, is delimited by groove flanks and a groove base of U-shaped cross section, and has a width which is ascertained at the tread periphery in the axial direction, wherein a number of projections, which are arranged distributed over the circumference of the circumferential groove and are situated opposite one another in pairs in the axial direction, are formed on the groove base, possibly with connection to the groove flanks, a groove path of the circumferential groove, which groove path reaches profile depth, has a constriction and is of symmetrical configuration with respect to a plane which is spanned by the radial direction and a vertical to the centre line of the circumferential groove, running between respective projections.

It is known to form projections, which serve as wear indicators or as sound absorbers, in circumferential grooves of treads of pneumatic vehicle tyres. During driving, projections which act as sound absorbers reduce the propagation of sound waves which form primarily in straight circumferential grooves and the frequencies of which lie in a range which is audible to humans. Wear indicators serve, in a known manner, in particular for indicating the legally prescribed minimum profile depth.

A pneumatic vehicle tyre of the type mentioned at the outset is known, for example, from DE 10 2014 218 871 A1. This pneumatic vehicle tyre has a tread with a circumferential groove in which projections which act as sound absorbers are situated opposite one another in pairs in the axial direction, wherein one projection has a smaller volume than the other projection. The smaller projection is situated opposite a cutout which is formed in the larger projection, passes through said larger projection in the radial direction and is of U-shaped cross section parallel to the tread periphery. As viewed in the longitudinal direction through the circumferential groove, a distance of from 2.0 mm to 3.0 mm remains between the projections.

Continuous efforts are being made to further optimize the projections which are provided in circumferential grooves and act as sound absorbers and/or wear indicators in respect of their influence on the water discharge capacity of the circumferential groove, in particular in order to reduce the risk of aquaplaning which occurs during driving on a wet roadway The invention is therefore based on the object of configuring the projections in a pneumatic vehicle tyre of the type mentioned at the outset in a more expedient manner with respect to the water discharge capacity of the circumferential groove.

According to the invention, the stated object is achieved in that the projections end at the groove flanks or at the groove base in the circumferential direction and run in such a way that the groove path runs symmetrically with respect to a second plane, which is spanned by the centre line of the circumferential groove and the radial direction, and is made up of two Venturi sections which narrow in the manner of a funnel to form the constriction.

When driving on a wet roadway, water flowing through the circumferential groove in the region of the projections is accelerated in an eddy-free or low-eddy manner by the Venturi sections of the groove path between the projections ("Venturi effect"), so that the water passes the projections more quickly and therefore a virtually unchanged good water discharge capacity is retained in the region of the projections.

According to a preferred embodiment, the Venturi sections have end sections which face one another and which together form a path section of the groove path, which path section is elongate in the circumferential direction in plan view, wherein the constriction of the groove path is located in the path section or is formed by the said path section. A path section of this kind is particularly advantageous in respect of the Venturi effect.

In this context, it is further advantageous when the path section has, in the circumferential direction, a length of from 25% to 35% of the maximum length of the groove path measured in the circumferential direction.

The Venturi sections are particularly effective when their width and/or depth are/is selected or designed in accordance with the following preferred embodiments. The projections on the groove path preferably each have a projection edge, wherein the Venturi sections at the constriction of the groove path have a width, which is ascertained between the projection edges in the axial direction, of at least 1.0 mm and at most 30% of the width of the circumferential groove. In particular, the width of the Venturi sections at the constriction is at most 25%, preferably at most 20%, of the width of the circumferential groove. Furthermore, it is preferred when the projection edges are at a constant distance of from 1.4 mm to 2.0 mm, in particular of 1.6 mm, from the level of the profile depth in the radial direction. The said dimensions contribute to providing the Venturi sections with a cross section which is advantageous in respect of the Venturi effect.

According to a further preferred embodiment, the projections have a constant height of from 1.4 mm to 2.0 mm, in particular of 1.6 mm, in the radial direction—ascertained in relation to the lowest point of the circumferential groove. A relatively large empty groove volume, which is advantageous in respect of the water drainage capacity of the circumferential groove, is retained in the region of projections of this kind.

It is advantageous for the effect of the Venturi sections when the projections have a maximum length of from 150% to 300%, in particular of from 180% to 250%, particularly preferably of from 200% to 230%, of the width of the circumferential groove in the circumferential direction.

According to a further preferred embodiment, transverse grooves which end in front of the circumferential groove run in at least one of the profile positives, which adjoin the circumferential groove, in the region of the projections, wherein a channel runs in the interior of the profile positive between the respective transverse groove and the constriction of the groove path, a sipe which is formed in the profile positive, extends in the radial direction, is designed to be narrower than the channel and has a width of from 0.4 mm to 1.2 mm issuing into said channel. When driving on wet roadways, water which is picked up by the transverse groove can be quickly discharged into the circumferential groove through the channel, wherein the water is fed to the constriction of the groove path and is therefore effectively accelerated in an expedient manner.

In this variant, it is advantageous when the channel protrudes beyond the sipe, as viewed in cross section, by from 0.15 mm to 2.0 mm, in particular by at least 0.5 mm, on each side.

Furthermore, it is advantageous in this variant when the transverse groove, the channel and the sipe are of symmetrical design with respect to the plane which is spanned by the radial direction and the vertical to the centre line of the circumferential groove.

The projections are designed in a particularly expedient manner in terms of flow when said projections are of trapezoidal design in plan view, wherein the base of the trapezoid lies on the groove base or on the respective groove flank of the circumferential groove.

According to a further preferred embodiment, a projection attachment which is integrally formed on the groove base and/or on the respective groove flank is formed on the projections, the associated projection protruding beyond the said projection attachment at its outer circumference and the said projection attachment having a constant height of from 2.6 mm to 3.4 mm, in particular of 3.0 mm, in the radial direction—ascertained in relation to the lowest point of the circumferential groove—, wherein the projection attachment preferably has, in plan view, the shape of a trapezoid with a trapezoid base which is situated on the respective groove flank or on the groove base of the circumferential groove. A projection attachment of this kind indicates that a critical remaining profile depth, in particular in respect of the water drainage capacity of the circumferential groove, has been reached.

It is further expedient when the pairs of projections which follow one another in the circumferential direction within the circumferential groove are at, in particular, corresponding mutual distances of from 10.0 mm to 70.0 mm, preferably of at least 30.0 mm.

Furthermore, it is expedient when at least five pairs of projections are formed within the circumferential groove.

Further features, advantages and details of the invention will now be described in more detail with reference to the drawing, which schematically shows an exemplary embodiment of the invention. In the drawing, FIG. 1 shows an enlarged oblique view of a detail of a tread of a pneumatic vehicle tyre in the region of a circumferential groove with one variant embodiment of the invention, FIG. 2 shows a plan view of a portion of the detail from FIG. 1, FIG. 3 shows a section along the line of FIG. 2, FIG. 4 shows a section along the line IV-IV of FIG. 2, and FIG. 5 shows a section along the line V-V of FIG. 2.

Pneumatic vehicle tyres designed in accordance with the invention are, in particular, tyres of the radial type for passenger cars, vans or light trucks.

Figure 2:
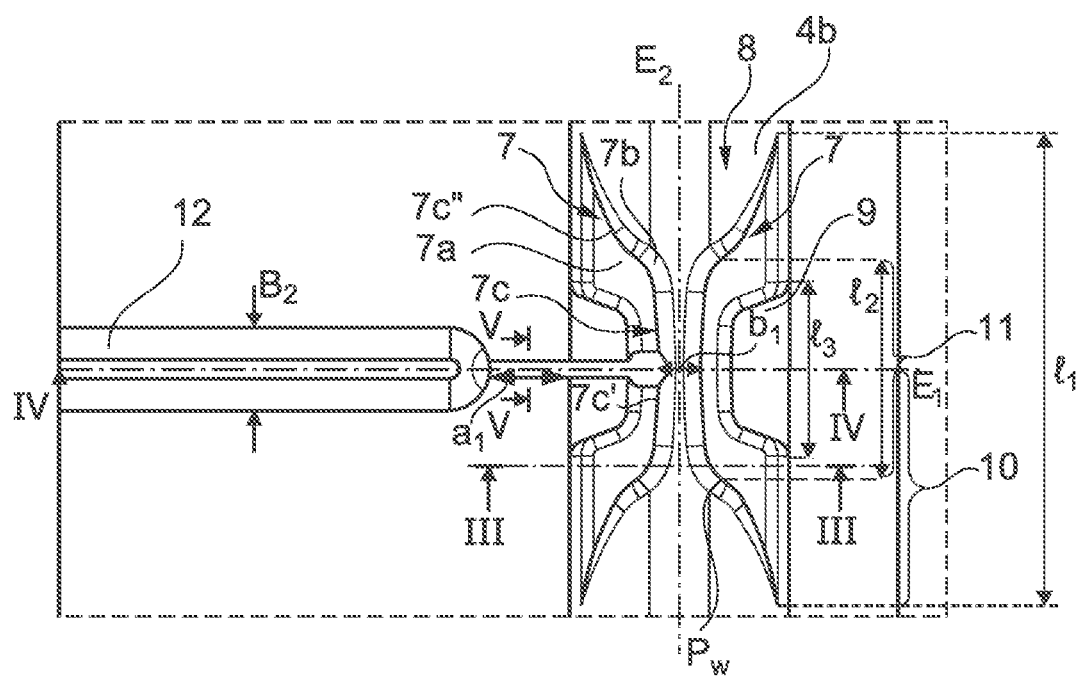

FIG. 1 shows a view of a tread detail in the region of a straight, shoulder-side circumferential groove 1 which separates a shoulder-side profile rib 2 from a central profile rib 3, merely indicated in FIG. 1.

The circumferential groove 1 is designed, in the radial direction, at the profile depth $T_1$ which is intended for the respective type of tyre and is usually from 6.5 mm to 10.0 mm for passenger cars, vans and light trucks, and has a width $B_1$ of preferably from 6.0 mm to 13.0 mm, in particular of at least 9.0 mm, at the tread periphery in the axial direction. The circumferential groove 1 is delimited by a groove base 4, which is of U-shape in cross section of the circumferential groove 1, in the exemplary embodiment of flat U-shape, a groove flank 5 which is formed on the shoulder-side profile rib 2, and a groove flank 6 which is formed on the central profile rib 3. In the exemplary embodiment shown, the groove base 4, as viewed in cross section of the circumferential groove 1, is made up of a central groove base section 4a, which runs at profile depth $T_1$, and two lateral rounded transition portions 4b. The groove flanks 5 adjoin the rounded transition portions 4b without a bend and run in the radial direction, but can also run to said rounded transition portions at corresponding or differing angles of up to 15°, in particular of up to 3°.

In the section of the circumferential groove 1 shown in FIG. 1, projections 7 which are located at least for the most part on the rounded transition portions 4b and are situated opposite one another in pairs in the axial direction and without an offset in the circumferential direction are formed on the groove base 4, a groove path 8 which has a constriction and reaches profile depth $T_1$ remaining or running between said projections.

The pair of projections 7 acts as a sound absorber and serves as a wear indicator, wherein the projections 7 are composed of the rubber material of the tread. A large number of projection pairs are provided within the circumferential groove 1, said projection pairs being arranged in a distributed manner, in particular in such a way that they are at mutual distances of from 10.0 mm to 70.0 mm, preferably of at least 30.0 mm, from one another. In the exemplary embodiment shown, a projection attachment 9 is located on each projection 7, the configuration of which projection attachment will be explained in more detail later.

According to FIG. 2, the projections 7 and the groove path 8 remaining between them are of symmetrical design with respect to a common plane $E_1$ which is spanned by the axial direction and the radial direction and coincides with section line IV-IV in FIG. 2. Furthermore, the projections 7 are configured in such a way that the groove path 8 is of symmetrical design with respect to a second plane $E_2$ which is spanned by the circumferential direction and the radial direction and runs through the centre of the circumferential groove 1.

As shown in FIG. 1 and FIG. 2, the projections 7 are of elongate configuration in the circumferential direction and also configured in the form of an isosceles trapezoid in plan view, wherein the trapezoid base lies on the respective rounded transition portion 4b, and wherein the projections 7 end in a manner corresponding to the trapezoid shape in the circumferential direction (FIG. 1). The projections 7 have a maximum length $l_1$ (FIG. 2) of from 150% to 300%, in particular of from 180% to 250%, particularly preferably of from 200% to 230%, of the width $B_1$ (FIG. 1) of the circumferential groove 1 in the circumferential direction and a height $h_1$ (FIG. 3), which is constant in the exemplary embodiment shown, of from 1.4 mm to 2.0 mm, in particular of 1.6 mm in the radial direction—ascertained in relation to the lowest point of the circumferential groove 1. The height $h_1$ therefore preferably corresponds to the statutory minimum profile depth of 1.6 mm prescribed in Germany. Furthermore, the projections 7 are each delimited in the radial direction by a top surface 7a (FIG. 1, FIG. 3) which is oriented parallel to the tread periphery and have projection flanks 7b which delimit the groove path 8 and adjoin the top surfaces 7a by means of projection edges 7c which are rounded or run without bends. The projection edges 7c end at the respective rounded transition portion 4b of the groove base 4 and are each made up of a central edge section 7c' and two end-side edge sections 7c", wherein the end-side edge sections 7c" each adjoin the central edge section 7c' by way of an inflection point $P_w$ (FIG. 3). The projection flanks 7b are rounded at least in sections over their entire extent, as viewed in cross section of the circumferential groove 1, in such a way that they merge with the groove base 4 without bends (FIG. 3).

The groove path 8, which is formed between the projections 7, is made up of two Venturi sections 10 which each narrow in the manner of a funnel or in a V-shape to form the said constriction of the groove path 8 (see FIG. 2 in particular). In the exemplary embodiment shown, the Venturi sections 10 have end sections which face one another and which together form a path section 11 of the groove path 8, which path section is straight in plan view, is U-shaped in cross section (FIG. 3) and has the constriction, (see FIG. 2 in particular).

The Venturi sections 10 have, in the plane $E_1$, a width $b_1$ which is ascertained between the projection edges 7c (FIG. 2) and is at least 1.0 mm and at most 30%, in particular at most 25%, preferably at most 20%, of the width $B_1$ (FIG. 1) of the circumferential groove 1.

According to FIG. 2, the path section 11—in relation to the projection edges 7c—reaches as far as the inflection points $P_w$ and is therefore delimited by the central edge sections 7c' at the level of the top surfaces 7a. The path section 11 has, in the circumferential direction, a length $l_2$ of from 25% to 35% of the maximum length $l_1$, which length $l_2$ is measured between the inflection points $P_w$ of one of the projection edges 7c. The central edge sections 7c' run, in relation to a line which connects their ends, in the circumferential direction and are bent in a slightly concave manner in relation to one another in plan view, so that the constriction of the groove path 8 is in the plane $E_1$. As an alternative, the central edge sections 7c' can be straight in the circumferential direction in plan view, so that the constriction of the groove path 8 is formed by the path section 10.

As shown in FIG. 1 and FIG. 2, the abovementioned projection attachments 9 are likewise of elongate configuration and also configured in the form of an isosceles trapezoid in plan view and in the circumferential direction, wherein the base of the trapezoid lies on the respective groove flank 5, 6 or the respective rounded transition portion 4b. The projections 7 protrude beyond the projection attachments 9, the projection attachments are delimited in the radial direction by a top surface 9a which is oriented parallel to the tread periphery (FIG. 3), end at a height $h_2$ (FIG. 3) of from 2.6 mm to 3.4 mm, in particular of 3.0 mm, in the radial direction—determined in relation to the lowest point or lowest region of the circumferential groove 1—and have a length $l_3$ (FIG. 2) of from 30% to 50%, in particular of up to 40%, of the length $l_1$ of the projections 7 in the circumferential direction.

In the exemplary embodiment shown, a transverse groove 12, which runs in the axial direction, ends in front of the circumferential groove 1 at a distance $a_1$ (FIG. 2), which is ascertained at the tread periphery in the axial direction, of preferably from 2.5 mm to 5.0 mm, has a width $B_2$ (FIG. 2) of, for example, from 2.0 mm to 5.0 mm on the outer surface of the profile rib 2 and, in the radial direction, a depth $T_2$ (FIG. 4) which preferably corresponds to the profile depth $T_1$ within the ground contact patch, is formed next to the projections 7 in the shoulder-side profile rib 2. As shown in FIG. 4 in particular, a channel 13 which is at profile depth $T_1$ runs between the transverse groove 12 and the path section 11 of the groove path 8. A sipe 14 (also see FIG. 1), which extends in the radial direction, runs between the transverse groove 12 and the circumferential groove 1, has a width of from 0.4 mm to 1.2 mm and is continued in the projection 7 which adjoins the profile rib 2 and includes the projection attachment 9 (FIG. 1), issues over the entire extent of the channel 13 into said channel. The channel 13 has a rounded cross section, a circular cross section in the exemplary embodiment, with a diameter $d_1$ (FIG. 5) which is selected in such a way that the channel 13 protrudes beyond the sipe 14, as viewed in cross section, by from 0.15 mm to 2.0 mm, in particular by at least 0.5 mm, on each side.

Both the transverse groove 12, the sipe 14 and also the channel 13 are of symmetrical design with respect to the said plane $E_1$ (FIG. 2, FIG. 4), and therefore extend in the axial direction or are oriented in the axial direction.

The invention is not limited to the exemplary embodiment described.

In particular, the projections 7 can also be formed in central circumferential grooves. The projection attachments 9 are optional.

LIST OF REFERENCE NUMERALS

1 . . . Shoulder-side circumferential groove
2 . . . Shoulder-side profile rib
3 . . . Central profile rib
4 . . . Groove base
4a . . . Groove base section
4b . . . Rounded transition portion
5 . . . Groove flank
6 . . . Groove flank
7 . . . Projection
7a . . . Top surface
7b . . . Projection flank
7c . . . Projection edge
7c' . . . Central edge section
7c" . . . End-side edge section
8 . . . Groove path
9 . . . Projection attachment
9a . . . Top surface
10 . . . Venturi section
11 . . . Path section
12 . . . Transverse groove
13 . . . Channel
14 . . . Sipe
$a_1$ . . . Distance
$B_1$, $B_2$, $b_1$ . . . Width
$d_1$ . . . Diameter
$E_1$, $E_2$ . . . Plane
$h_1$, $h_2$ . . . Height
$l_1$ . . . Maximum length
$l_2$, $l_3$ . . . Length
$P_w$ . . . Inflection point
$T_1$ . . . Profile depth
$T_2$ . . . Depth

The invention claimed is:

1. A pneumatic vehicle tire comprising:
a tread with a straight circumferential groove running to a tread depth ($T_1$) and delimited by groove flanks and a groove base with a U-shaped cross-section, an axial direction on a tread periphery determined width ($B_1$)
a plurality of projections arranged distributed over a circumference of the circumferential groove, the projections arranged in pairs opposite one another in the axial direction being formed on the groove base and connected to the groove flanks, between which a groove path extends to the profile depth ($T_1$), and the groove path has a constriction between the pair of opposite projections, which with respect to a plane ($E_1$) spanned by a radial direction and a perpendicular to a center line of the circumferential groove is designed symmetrically;
the pair of opposite projections run out and run in such a way that the groove path runs symmetrically with respect to a second plane ($E_2$) spanned by the center line of the circumferential groove and the radial direction, and the pair of opposite projections together form two funnel-like venturi sections each fluidly connected to opposite sides of the constriction in the circumferential direction;

wherein the constriction at its narrowest point between the pair of opposite projections has a width in the axial direction of at least 1.0 mm and at most 30% of the width ($B_1$) of the circumferential groove;

wherein each of the pair of opposite projections includes a projection attachment on the respective projections and connected to the groove base and to the respective groove flank, which an outer edge of the respective projection attachments is surmounted by the associated projection to thereby form a stepped profile in the radial direction associated with each of the pair of opposite projections.

2. The pneumatic vehicle tire according to claim 1, wherein the venturi sections comprising end sections which face one another and together form a path section of the groove path elongated in the circumferential direction in plan view, the constriction of the grooved path (8) being located in the path section (11) or formed by the path section (11); and wherein the path section has a length (12) of from 25% to 35% of a maximum length ($l_1$) of the grooved path measured in the circumferential direction.

3. The pneumatic vehicle tire according to claim 1, a width ($b_1$) of the venturi sections at the constriction is at most 20% of the width ($B_1$) of the circumferential groove.

4. The pneumatic vehicle tire according to claim 1, the protruding edges have a constant spacing of from 1.4 mm to 2.0 mm from the level of the profile depth ($T_1$) in the radial direction.

5. The pneumatic vehicle tire according to claim 1, wherein the projections are trapezoidal in plan view with a trapezium base which lies on the groove base and on the respective groove flank.

6. The pneumatic vehicle tire according to claim 1, wherein each of the projection attachments in the radial direction, as determined from the lowest point of the circumferential groove, has a constant height ($h_2$) of from 2.6 mm to 3.4 mm, and wherein each projection attachment, in plan view, has a shape of a trapezium with a trapezium base lying on the respective groove flank and/or on the groove base.

7. The pneumatic vehicle tire according to claim 1, wherein the tread comprises positive profiles adjoining the circumferential groove and running in the circumferential direction, and in at least one of the positive profiles, in the region of the projections, comprises at least one transverse groove ending in front of the circumferential groove, with a channel running inside the positive profile between the respective transverse groove and the narrow point of the groove path to thereby fluidly connect the groove path with the at least one transverse groove of the at least one positive profile.

8. The pneumatic vehicle tire according to claim 1, the projections have a constant height ($h_1$) of from 1.4 mm to 2.0 mm in the radial direction, as determined relative to a lowest point of the circumferential groove.

9. The pneumatic vehicle tire according to claim 8, the projections, in the circumferential direction, have a maximum length ($l_1$) of from 150% to 300% of the width ($B_1$) of the circumferential groove (1).

10. The pneumatic vehicle tire according to claim 1, pairs of the projections follow one another within the circumferential groove and have corresponding mutual distances of from 10.0 mm to 70.0 mm.

11. The pneumatic vehicle tire according to claim 10, the pairs of projections comprise at least five pairs of projections.

12. The pneumatic vehicle tire according to claim 1, the tread comprises positive profiles adjoining the circumferential groove and running in the circumferential direction, and in at least one of the positive profiles, in the region of the projections, comprises at least one transverse groove ending in front of the circumferential groove, with a channel running inside the positive profile between the respective transverse groove and the narrow point of the groove path in which a positive profile formed incision, which is above the channel and extends in the radial direction and is narrower than the channel, has a width of from 0.4 mm to 1.2 mm.

13. The pneumatic vehicle tire according to claim 12, the channel extends further than the incision in the transverse direction, as viewed in cross section, on each side by 0.15 mm to 2.0 mm.

14. The pneumatic vehicle tire according to claim 12, wherein the at least one transverse groove, the channel and the incision, with respect to the plane ($E_1$) spanned by the radial direction and the perpendicular to the center line of the circumferential groove, are symmetrical.

15. A pneumatic vehicle tire comprising a tread with at least one particular straight circumferential groove (1) running to a tread depth ($T_1$) and delimited by groove flanks (5, 6) and a groove base (4) with a U-shaped cross-section, with an axial direction on a tread periphery determined width ($B_1$), a number of projections (7) arranged distributed over a circumference of the circumferential groove (1), arranged in pairs opposite one another in the axial direction being formed on the groove base (4), and optionally connected to the groove flanks (5, 6), between which a groove path (8) of the circumferential groove (1) extends to the profile depth ($T_1$) and the groove path has a constriction between the pair of opposite projections, which with respect to a plane ($E_1$) spanned by a radial direction and a perpendicular to a center line of the circumferential groove (1) is designed symmetrically;

wherein the pair of opposite projections (7) on the groove flanks (5, 6) or on the groove base (4) in a circumferential direction run out and run in such a way that the groove path (8) runs symmetrically with respect to a second plane ($E_2$) spanned by the center line of the circumferential groove (1) and the radial direction, and pair of opposite projections together form two funnel-like constriction venturi sections (10) each fluidly connected to opposite sides of the constriction in the circumferential direction; and, wherein the tread comprises positive profiles (2, 3) adjoining the circumferential groove (1) and running in the circumferential direction, and wherein in at least one of the positive profiles (2, 3), in the region of the projections (7), comprises at least one transverse groove (12) ending in front of the circumferential groove (1), with a channel (13) running inside the positive profile (2 or 3) between the respective transverse groove (12) and the narrow point of the groove path (8), in which a positive profile formed incision (14), which is above the channel and extends in the radial direction and is narrower than the channel (13), has a width of from 0.4 mm to 1.2 mm.

16. The pneumatic vehicle tire according to claim 15, wherein the channel (13) extends further than the incision (14) in the transverse direction, as viewed in cross section, on each side by 0.15 mm to 2.0 mm.

17. The pneumatic vehicle tire according to claim 15, wherein the transverse groove (12), the channel (15) and the incision (14), with respect to the plane ($E_1$) spanned by the radial direction and the perpendicular to the center line of the circumferential groove (1), are symmetrical.

18. A pneumatic vehicle tire comprising:
a tread with a straight circumferential groove running to a tread depth ($T_1$) and delimited by groove flanks and a groove base with a U-shaped cross-section, an axial direction on a tread periphery determined width ($B_1$)
a plurality of projections arranged distributed over a circumference of the circumferential groove, the projections arranged in pairs opposite one another in the axial direction being formed on the groove base and connected to the groove flanks, between which a groove path extends to the profile depth ($T_1$), and the groove path has a constriction between the pair of opposite projections, which with respect to a plane ($E_1$) spanned by a radial direction and a perpendicular to a center line of the circumferential groove is designed symmetrically;
the pair of opposite projections run out and run in such a way that the groove path runs symmetrically with respect to a second plane ($E_2$) spanned by the center line of the circumferential groove and the radial direction, and the pair of opposite projections together form two funnel-like venturi sections each fluidly connected to opposite sides of the constriction in the circumferential direction;
wherein the constriction at its narrowest point between the pair of opposite projections has a width in the axial direction of at least 1.0 mm and at most 30% of the width ($B_1$) of the circumferential groove; and
wherein the tread comprises positive profiles adjoining the circumferential groove and running in the circumferential direction, and in at least one of the positive profiles, in the region of the projections, comprises at least one transverse groove ending in front of the circumferential groove, with a channel running inside the positive profile between the respective transverse groove and the narrow point of the groove path to thereby fluidly connect the groove path with the at least one transverse groove of the at least one positive profile.

* * * * *